LOW-LOSS, LOW-DISTORTION TRANSMISSION LINES

Filed May 1, 1967

INVENTOR
R. C. LEVINE
BY Leo Stanger
ATTORNEY

United States Patent Office 3,439,120
Patented Apr. 15, 1969

3,439,120
LOW-LOSS, LOW-DISTORTION TRANSMISSION LINES

Richard C. Levine, Plainfield, N.J., assignor to Bell Telephone Laboratories, Incorporated, Berkeley Heights, N.J., a corporation of New York
Filed May 1, 1967, Ser. No. 635,126
Int. Cl. H01b *11/16*
U.S. Cl. 178—45 13 Claims

ABSTRACT OF THE DISCLOSURE

Low-distortion, low-loss transmission is achieved by terminating a transmission line, whose distributed parameters are a per-unit-length series impedance $z$, and a per-unit-length shunt admittance $y$, with a terminating impedance $Z_T$ equal to $zv/j\omega$ where $v$ is a convenient wave propagation speed, and by shunting the line at substantially equal distances $x$, with respective admittances $Y_N$ each equal to $[z/Z_T^2-y]x$.

BACKGROUND OF THE INVENTION

*Field of the invention*

This invention relates to wave transmission networks and particularly to communication cables whose transmission lines incorporate means for transmitting communication signals with little distortion or loss.

*Description of the prior art*

Past attempts at reducing distortion and loss in a transmission line have involved adding series inductors or series negative resistances at intervals along the transmission line. Both expedients have served mainly to reduce the ratio of the line's series resistivity $R_1$ to the line's inductivity, that is its inductance per unit length, $L_1$. They therefore effectively reduced the line's attenuation. Moreover, by making the ratio $R_1/L_1$ approach the usually small ratio $G_1/C_1$ of the line's shunt conductivity to shunt capacitance, they reduced the problems arising from the irrational frequency functions which otherwise characterize the line's characteristic impedance $Z_0$ and its propagation constant $\gamma$.

With modern requirements for greater transmission capacity, these efforts have been found wanting. Inductors produce destructive interference when the signal wavelength is approximately four times the inductor spacing. At this wavelength the combination of lines and inductors act as a low-pass wave filter. On the other hand, negative series resistances, to be fully effective in reducing loss and distortion, require lines whose matched terminations are purely resistive. In practical systems, gain is sacrified to accommodate reactive terminations. Thus to this time, combinations of these expedients have failed to yield the desirable combination of low-loss, low-distortion transmission for reactive terminations.

THE INVENTION

According to the invention low-distortion and low-loss is achieved in a transmission line, by keeping the line free of series impedances and shunting the line periodically with negative impedance shunt loading networks each of which balances out the line's existing per-unit-length admittance $y$ and at the same time establishes in its stead another net admittance that supplements the signal energy in the line and varies the phase of the signal so that it tends to rise more linearly with frequency. According to a more particular feature of the invention the other admittance is such as to modify the line's per-unit-length admittance toward that required for an ideally-terminated ideal lossless distortionless transmission line, namely one where $\sqrt{z/y}=Z_0=Z_T$, and $\sqrt{zy}=j\omega/v$. In these formulas $z$ is the per-unit-length loop impedance of the line, $Z_0$ is the line's characteristic impedance, $Z_T$ is its terminating impedance and $v$ is any one of a range of real propagation speeds less than the line's intrinsic wave speed.

According to a still more specific feature, low-distortion, low-loss transmission is achieved by making the new admittance equal substantially to $z/Z_T^2$, where $Z_T=zv/j\omega$. By virtue of the invention, low-loss, low-distortion transmission is achieved with a wide range of terminations for any particular line. The terminations' values depend mainly on the series loop impedance per-unit-length without depending upon the shunt admittance per-unit-length.

According to another more specific feature of the invention, particularly where skin effect is negligible, a transmission line, whose per-unit-length parameters include a resistivity $R_L$, an inductivity $L_L$, a capacitance $C_L$ and a conductivity $G_L$, is made distortionless by terminating it with a resistance $R_T$ equal to $L_Lv$ wherein $v$ equals a suitably selected propagation speed and a series capacitance $C_T$ equal to $1/R_Lv$, and by periodically shunting the line at distances $x$ with a capacitor $[1/R_Tv-C_L]x$ in parallel with a resistor $-1/G_Lx$ and a series network having a resistance $-R_T^2C_Tv/x$ and a capacitance $-x/R_Tv$.

These and other features of the invention are pointed out in the claims. Other advantages and objects of the invention will become evident from the following detailed description when read in light of the accompanying drawings:

DESCRIPTION OF THE EMBODIMENTS

Figure 1:
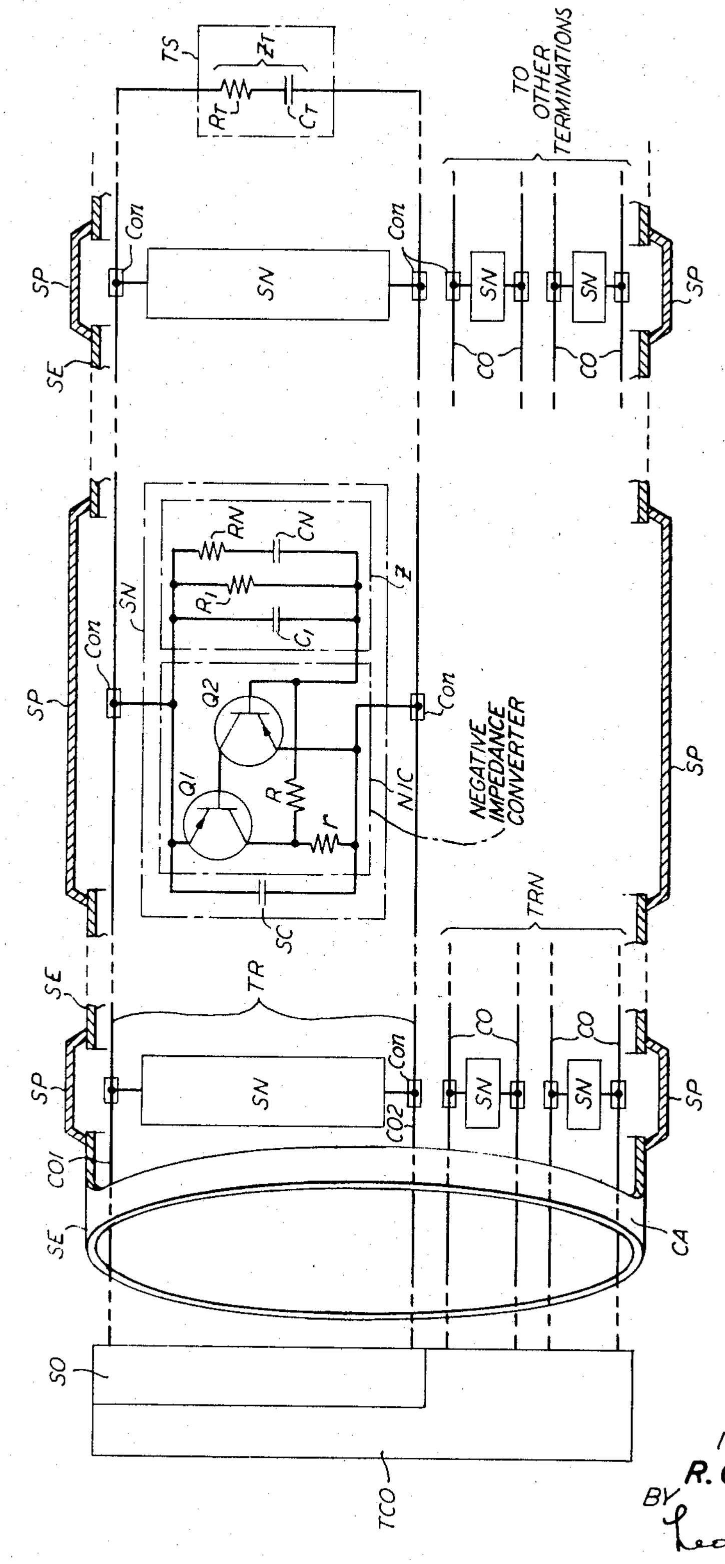
FIG. 1 is a partially schematic block diagram illustrating a communication transmission system embodying features of the invention.

In FIG. 1 two insulated conductors CO1 and CO2, among many such insulated conductors CO in a telephone distribution cable CA, form a transmission line TR among many such lines TRN. The cable CA is composed of longitudinally sequential cable segments SE having substantially equal lengths $x$ which are joined by splices SP. Within the splices SP suitable connectors Con join the sequential wire segments that make up the respective conductors CO1, CO2 and CO. The transmission line TR ends at telephone set TS having a terminating impedance $Z_T$. The terminating impedance $Z_T$ is composed of a resistive portion $R_T$ and a capacitive portion $C_T$. The The transmission line TR, together with the other lines TRN, starts in a telephone central office TCO. In the office TCO a source SO, exhibiting to the line TR an impedance equal to that of the terminating impedance $Z_T$, transmits electrical communication signals along the lines CO1 and CO2. It also supplies a direct voltage across the lines CO1 and CO2 so that the conductor CO1 is positive relative to the conductor CO2. Periodically shunting the connectors Con in the conductors CO1 and CO2 and pairs of the conductors CO, are a plurality of shunt networks SN.

Figure 2:
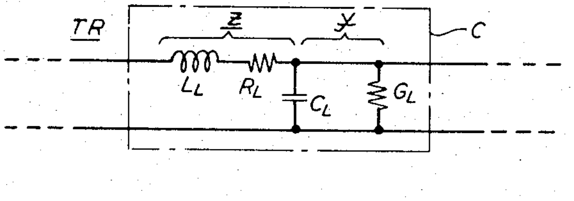
FIG. 2 is a schematic diagram illustrating the lumped parameter equivalent circuit of a transmission line segment in FIG. 1.

The transmission line TR when otherwise not connected to load or compensated by the networks SN exhibits a loop impedance composed of the impedances of successive incremental line lengths, each of which approximates the impedance of the lumped parameter circuit C shown in FIG. 2. The shorter the incremental length considered the more closely successive combinations of the circuit C approximate the impedance of the line TR. Thus the line TR exhibits a series loop impedance per-unit-length $z$ and a shunt admittance per-unit-length $y$. The per-unit impedance $z$ is composed of a resistivity or per-unit-length resistance $R_L$ and an inductivity or per-unit-length inductance $L_L$. The per-unit-length admittance $y$ is composed of a shunt conductivity or per-unit-length conductance $G_L$ and a shunt per-unit-length capacitance $C_L$.

The $R_T$ of the termination $Z_T$ may have any value of $R_T=L_Lv$, and the capacitance $C_T$ any value $1/R_Lv$, where $v$ is a speed conveniently selected from a range of wave propagation speeds less than the intrinsic propagation speed $1/\sqrt{L_LC_L}$ of the transmission line TR. The value $v$ is a scalar quantity and hence real. It is selected to make $R_T$ and $C_T$ convenient to the apparatus of which the termination $Z_T$ is composed. The distance $x$ between splices is less than the longest distance over which the approximation represented by the lumped parameters of FIG. 2 is reasonable in terms of the highest frequency to be transmitted.

In FIG. 1, forming each of the shunt networks SN is a shunt capacitor SC whose value is $x/R_Tv$. Connected parallel across the capacitor SC is a negative impedance converter NIC that terminates in an impedance Z. Any one of a number of negative impedance converters may be used.

Forming the illustrated negative impedance converter NIC is a high $\beta$ PNP transistor Q1 whose collector is biased from the negative conductor CO2 through a resistor $r$ and whose emitter connects to the positive conductor CO1. Feeding the base of the transistor Q1 is the collector of a high $\beta$ transistor Q2 whose own emitter is connected to the conductor CO2 and whose own base receives signals fed back from the collector of transistor Q1 through a resistor R whose value is $n \cdot r$. The impedance exhibited by input of the negative impedance circuit over a suitable range equals the negative of $Z/n$, namely $-Z/n$. The operation of the illustrated negative impedance converter is described fully in the Technical Report of Minoro Nagata No. 4813–5 prepared under Office of Naval Research Contract Nonr–225(44), NR 375865 by the Solid State Electronics Laboratory, Stanford Electronics Laboratory, Stanford University, Stanford, Calif. No. SEL–65–037.

The impedance Z is composed in part of a resistor $R_1$ whose value is equal to $n/G_Lx$ and a capacitor $C_1$ equal to $nC_Lx$. Since the impedance exhibited by the negative impedance converter NIC is the negative of the impedance $Z/n$ the effects of the resistor $R_1$ and capacitor $C_1$ are to balance out the positive shunt conductivity $G_L$ and the positive shunt capacitance $C_L$ over the distance $x$ of the transmission line TR. The impedance Z also includes in parallel with the resistor $R_1$ the resistor RN and a capacitor CN in series therewith. The values of the resistor RN are equal to $R_T^2C_Tv/xn$. The value of the capacitor CN is equal to $nx/R_Tv$. This resistor and capacitor thus establish across the line an additional negative impedance that changes the admittance of the line TR. In fact, together with the capacitor SC the admittance across the line corresponds to that of a capacitor connected across the line having a value $x/R_Tv$ and a series RC circuit composed of a resistance equal to $-R_T^2C_Tvx$ and a capacitance $-x/R_Tv$.

Since capacitors SC and $C_1$ are subtractive, a single capacitor may be substituted for their combination at either the input or output of the converter NIC depending upon the resulting sign when the capacitance values are subtracted.

A general qualitative appreciation of the operation of FIG. 1 can be obtained by considering a signal transmitted by the source SO along the line TR. That signal reaches a network SN in somewhat attenuated form due to the line's intrinsic impedance $z$ and admittance $y$. The network SN responds by reflecting part of the waveform in both directions. However, by virtue of its negative impedance the energy of the reflected wave can be greater than the arriving wave. The network SN supplements the energy passing the network SN so that the latter exceeds the arriving energy. By virtue of the relation of the network's components to the phase of the incoming signal the phase of the passing signal is changed to be substantially linear with frequency. At the same time, because of the phase shift, the reflective wave avoids strong destructive interference effects. Thus attenuation and distortion of the line TR are substantially reduced at each network SN. The networks SN are such as to supplement the signals and phase them so they appear to be encountering a substantially lossless and distortionless line.

A more qualitative and rigorous explanation is available by considering the circuit of FIG. 2. In operation when uncompensated as shown in FIG. 2, the intrinsic distributed per-unit-length impedances $z$ and per-unit length admittances $y$ of the line TR distort and attenuate signals generated by the source SO. The distance $x$ is small enough so that the approximations represented by FIG. 2 are valid. Then the networks SN at intervals $x$ change the per-unit-length admittance $y$ of the line TR. In each network SN the resistors $R_1$ whose values are $n/G_Lx$ and which are formed by the negative impedance converters into values $-1/G_Lx$ balance the values of the conductances $G_Lx$ for each line segment over which $G_L$ is measured. The capacitors $C_1$ in each network SN similarly balance and practically eliminate the effect of the capacitance $C_L$ in each line segment. Moreover, the capacitors SC of each network SN and the members RN, and CN introduce over any distance $x$ capacitances across the line having the value $1/R_Tv$ and series RC circuits across the line whose resistance values are $-R_T^2C_Tv$ and whose capacitive values are $-1/R_Tv$. The resulting total admittance $y'$ of the shunt network SN and its associated line segment over a distance $x$ equals $$y'=j\omega(SC)+\frac{1}{\frac{1}{(RN)}+j\omega(CN)}$$

$$y'=\frac{j\omega}{R_Tv}+\frac{1}{\frac{1}{-R_T^2C_Tv}+j\omega\left(-\frac{1}{R_Tv}\right)}$$

At the same time the terminating impedance $Z_T$ has a value $R_T+1/j\omega C_T$ where $$R_T=vL_L \text{ and } C_T=1/vR_L$$

The terminating impedance $Z_T$, and the shunt networks when placed at comparatively short intervals along the line, closely approximate the condition for a distortionless lossless line, namely that $\sqrt{zy'}=j\omega/v$, and $\sqrt{z/y'}=Z_T$. This becomes evident from replacing $R_T$ and $C_T$ in $y'$ with their values in terms of $R_L$ and $L_L$.

Thus, $$y'=\frac{j\omega}{L_Lv^2x}-\frac{1}{\frac{L_L^2v^2x}{R}+\frac{L_Lv^2x}{j\omega}}$$

$$=\frac{1}{L_Lv^2x}\left[j\omega-\frac{1}{\frac{L_L}{R_L}+\frac{1}{j\omega}}\right]$$

$$y'z=\frac{j\omega L_Lx+R_Lx}{L_Lv^2x}\left[j\omega-\frac{1}{\frac{L_L}{R}+\frac{1}{j\omega}}\right]$$

$$\sqrt{y'z}=\sqrt{\frac{(j\omega L_Lx+R_Lx)}{L_Lv^2x}\left[\frac{\omega^2L_L}{j\omega L_L+R}\right]}$$

$$\sqrt{y'z}=\sqrt{-\frac{\omega^2}{v^2}}=j\omega/v$$

This condition defines an attenuationless line. Moreover, $$Z_T=R_T+1/j\omega C_T$$

Substituting for $R_T$ and $C_T$ their respective values $$Z_T=L_Lv+vR_L/j\omega=(v/j\omega)(j\omega L_L+R_L)$$

However, $j\omega L_L+R_L=z$ and $v/j\omega=1/\sqrt{zy'}$.

Thus, $Z_T=Z/\sqrt{zy'}=\sqrt{z/y'}$.

But $\sqrt{z/y'}$ is the characteristic impedance $Z_0$ of the line and hence the line is terminated for minimum distortion or reflection of the signal.

The general conditions for a lossless distortionless line exist when $$Z_T=zv/j\omega \text{ and } y'=Z/Z_T^2$$

This is so because $y'=z/(Z^2v^2/j^2\omega^2)$.

Thus $\sqrt{y'z}=j\omega/v$. This satisfies one criterion. Now $$Z_T=\frac{z\left[\frac{j\omega}{\sqrt{y'z}}\right]}{j\omega}=\sqrt{z/y'}$$

This satisfies the other criterion for a lossless distortionless line.

In effect therefore the network SN modifies the admittance $y$ to a value necessary for conforming to the conditions for a distortionless line with an ideal terminating impedance. Thus waveforms emerging from the source SO encounter an almost ideal lossless distortionless line.

Figure 3:
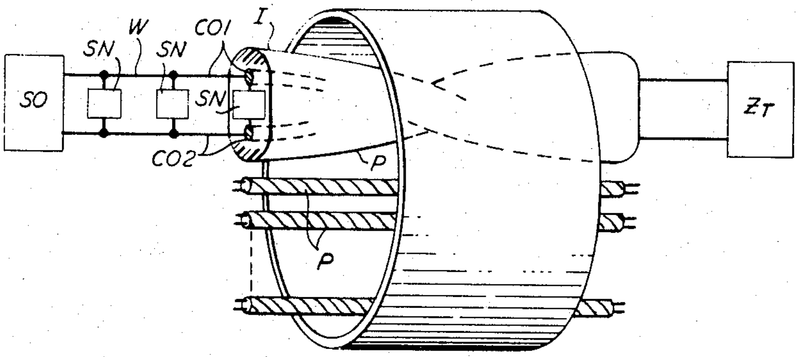
FIG. 3 is a partly schematic diagram illustrating a communication transmission system like that of FIG. 1 having another transmission line and also embodying features of the invention.

In FIG. 1 the networks SN shunt line TR without intervening series loads. Thus the network SN is always balanced with respect to the conductor CO1 and CO2. Furthermore, the shunt network SN is affected only by differences in voltage between the conductors. Therefore, lightning surges or induced power line voltages affecting the conductors CO1 and CO2 equally do not flow through the networks SN and are not amplified by them. As shown in FIG. 1 the shunt networks are used in existing conventional cable systems by connecting them between the conductor connectors that join sequential lengths of respective conductors in cable splices. This greatly improves the usable bandwidth of existing equipment. Moreover, the simplicity of the circuits in the shunt networks SN permits integrating the shunt networks into the cable sheath along with the conductor pairs. Present techniques of integrated circuitry make this possible. As a result, thinner copper wires or wires of metals having higher resistivities at lower costs are feasible. A cable using circuits integrated into the line is shown in the system of FIG. 3, where conductors CO1 and CO2 comprise wires W having networks SN of integrated structure connected between them at suitable intervals under the insulation I which surrounds the wires W to form twisted pairs *p*.

The shunt networks SN, by eliminating the need for series impedances in the line, permit free flow of direct currents for energizing the negative impedance converters NIC. As a result, no supplementary direct power is necessary in transmission lines TR.

Figure 4:
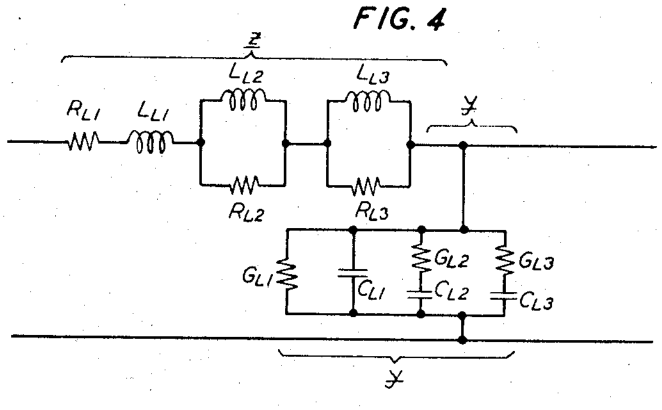
FIG. 4 is a schematic diagram illustrating another lumped parameter equivalent circuit of a transmission line segment of the line of FIG. 1.

The invention is applicable even at those high frequencies above which individual line segments can be considered as presentable by the lumped parameter illustrated in FIG. 2, mainly by the values $L_L$, $R_L$, $C_L$, and $G_L$. That is to say, the invention may be extended to the range of frequencies at which skin effect becomes important. At these frequencies line segments have the characteristics of the circuits of FIG. 4. Here, the resistors $R_{L1}$, $R_{L2}$, $R_{L3}$, inductors $L_{L1}$, $L_{L2}$, $L_{L3}$, capacitors $C_{L1}$, $C_{L2}$, $C_{L3}$ and conductances $G_{L1}$, $G_{L2}$, $G_{L3}$ present a more complex pattern. However, as long as $Z_T=zv/j\omega$, and in each network SN the net $y'=xz/Z_T^2$, that is $y'$ is substantially equal to $[z/Z_T^2-y]x-yx$, signals leaving the source SO encounter an essentially lossless line. Since $v$ is speed, a scalar quantity, it must be real.

Figure 5:
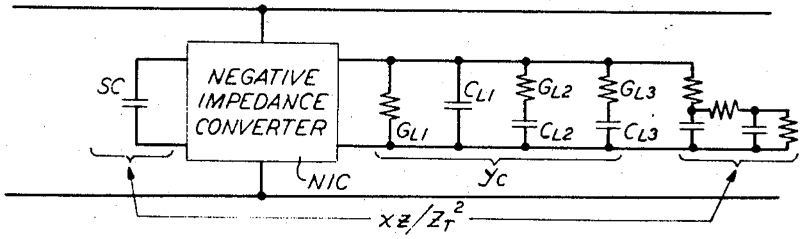
FIG. 5 is a schematic diagram of another shunt network suitable for the lines of FIGS. 1 and 3.

An example of a circuit utilizing this more general condition appears in FIG. 5. This corresponds substantially to the circuit of FIG. 1. However, the impedance Z here includes a circuit portion generally designated $y_C$ whose admittance equals $yx$ and a circuit portion whose net admittance equals $xz/Z_T^2$. FIG. 5 corresponds otherwise to FIG. 1. FIG. 1 thus represents a more specific embodiment of the general form in FIG. 5.

Figure 6:
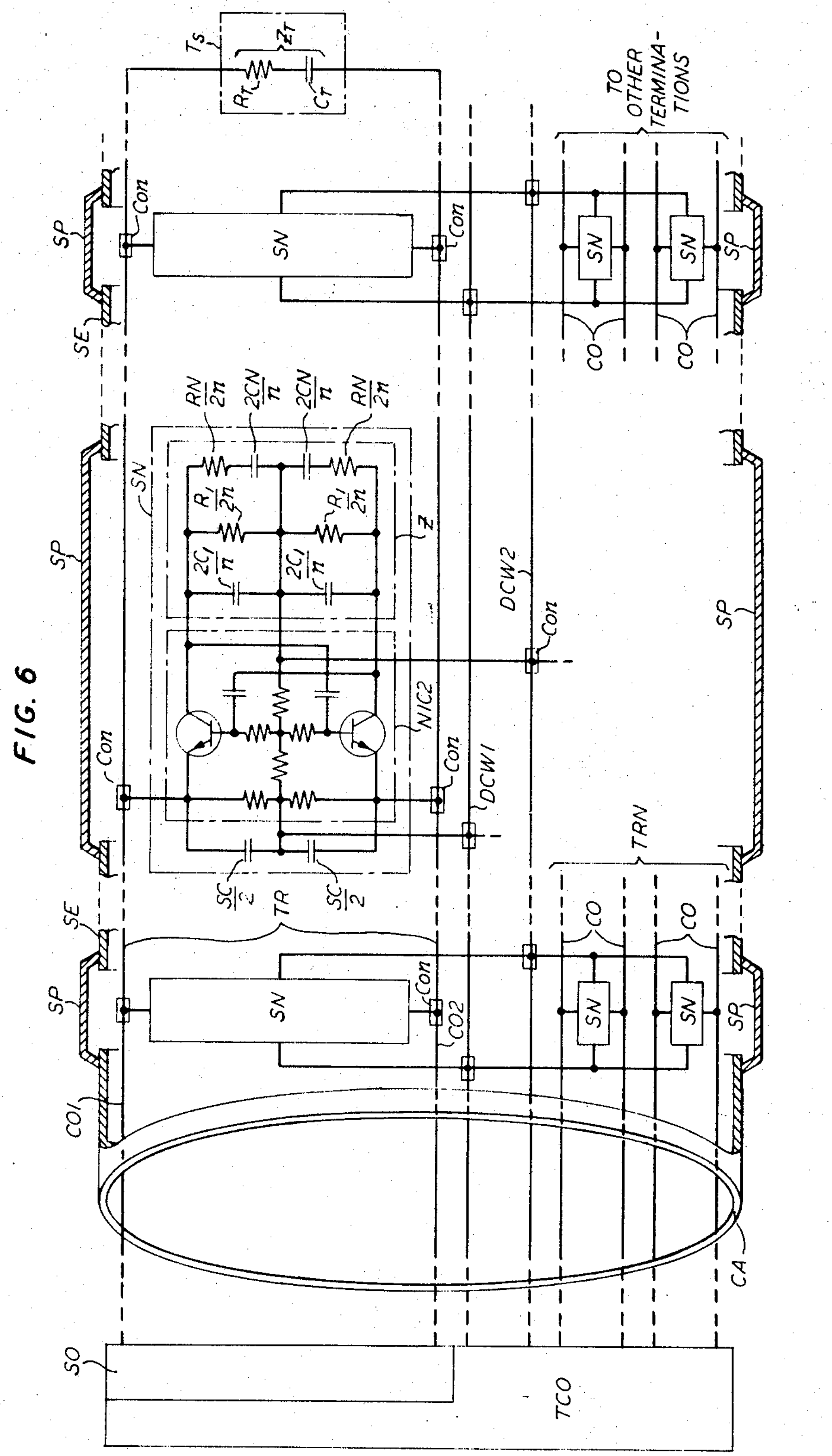
FIG. 6 is a partially schematic block diagram illustrating another transmission system, similar to that of FIG. 1, and also embodying features of the invention.

FIG. 6 illustrates a system, corresponding to that of FIG. 1, wherein wires separate from the transmission lines furnish the direct current for operating the negative impedance converted in each shunt network SN. In such a system a single heavy pair of lines DCW1 and DCW2 efficiently furnish the needed direct current to all the shunt networks. The transmission lines CO, CO1 and CO2 then need only be heavy enough to carry the communications signals. FIG. 6 utilizes in place of converters NIC negative impedance converters NIC2 that separate direct-current lines DCW1 and DCW2 from the signal lines CO, CO1 and CO2. This prevents signals from passing along the direct-current lines. The negative impedance converters are the type disclosed in June 1953 Proceedings of the Institute of Radio Engineers, Volume 41, pages 725 et seq. by J. G. Linville. They require splitting the members in the impedance Z so that the elements therein have the values shown with respect to the values in FIG. 1. The value $n$ appears in FIG. 6 since the comparison is made to FIG. 1. In FIG. 1 $n=R/r$ represents a conversion factor for the negative impedance converter. In FIG. 6 the circuit NIC2 has a unity conversion. The comparison is simpler if, in FIG. 1, $n$ is made equal to 1.

While embodiments of the invention have been described in detail, it will be obvious to those skilled in the art that the invention may be otherwise embodied without departing from its spirit and scope.

What is claimed is:

1. A circuit for connection across the conductors of a transmission line terminated at each end by coresponding termination impedances, comprising negative impedance converter means having an input side and an output side and exhibiting at its output side the negative of the impedance appearing at its input side, conductive means connecting said output side of said negative impedance converter means between said conductors, impedance means connected to said negative impedance converter means for establishing an impedance between said conductive means that changes the total admittance of the line over a predetermined distance along the line toward a value which is the quotient of the series impedance of the line over the predetermined distance divided by the square of the terminating impedance.

2. A device as in claim 1 wherein said impedance means include first impedance means on the input side of said negative impedance converted means and second impedance means on the output side of said negative impedance converter.

3. A device as in claim 1 wherein said impedance converter means include a first impedance network having a value equal to the line admittance over the predetermined length and connected to the output side of the negative impedance converter means and a second impedance network connected to one of the sides of said negative impedance converter.

4. A device as in claim 1 wherein the predetermined distance is $x$, and said impedance means form with said negative impedance converter means a capacitance $x/R_Tv-xC_L$ and further include across the input side of said negative impedance converter means a resistance $1/G_Lx$ and a series network having a resistance $R_T^2C_Tv/x$ and a capacitance $x/R_Tv$, where $C_L$ and $G_L$ are the capacitance of the line over the distance $x$ and $R_T$ and $C_T$ are the series resistance and capacitive components of said terminating impedance and wherein $v=R_T/L_L=C_TR_L$, $L_L$ and $R_L$ being the respective series inductance and series resistance of the line over the distance $z$.

5. A device as in claim 1 wherein said impedance means and said converter means change the value of the admittance of said line over the predetermined distance $x$ from its capacitance $C_L$ and conductance $G_L$ toward a total value represented by a shunt capacitor having a value $x/R_Tv$ and a shunt circuit composed of a series resistor $-R_T^2C_Tv/x$ and a series capacitor $-x/R_Tv$ wherein $R_T$ and $C_T$ represent the series resistance and series capacitance of said terminating impedance and $v=R_T/L_L=C_TR_L$, $R_L$ and $L_L$ being the loop resistance and loop inductive over the line over the distance $x$.

6. A transmission system, comprising a transmission line having a substantially uniform distributed loop impedance per-unit-length of $z$ and loop admittance per-unit-length $y$, terminal means at each end of said line having a value $Z_T$, a plurality of negative impedance converter means each having an input and an output and exhibiting at said output the negative of the impedance at said input, conductive means on each of said negative impedance converter means for connecting the output of said negative impedance converter means across said line at spaced periodic locations, impedance means connected to each of said negative impedance converter means for establishing therewith an impedance between said conductive means that changes the total admittance $y$ over a portion of the line equal to the distance between locations toward a value $z/Z_T^2$.

7. A transmission system as in claim 6 wherein said line includes a plurality of connected line segments with connector means joining said segments, and wherein said conductive means connect said negative impedance converter means across said conductive segments.

8. A transmission system as in claim 6 wherein said line includes two conductors and each of said converter means and each of said conductive means form a part of respective integrated circuits connected between the conductors of said line.

9. A transmission system as in claim 6 wherein said impedance means include first impedance means on the input side of said negative impedance converter means and second impedance means on the output side of said negative impedance converter.

10. A transmission system as in claim 6 wherein said impedance converter means include a first impedance network having an admittance equal to the line admittance over the predetermined length and connected to the output side of the negative impedance converter means and a second impedance network connected to one of the sides of said negative impedance converter.

11. A transmission system as in claim 6 wherein said conductive means connecting said converter means are separated from each other by a distance $x$ and wherein said impedance $z$ per-unit-length is approximated by a series resistance per-unit-length $R_L$ and a series inductance per-unit-length $L_L$, said admittance per-unit-length $y$ being approximated by a per-unit-length conductance $G_L$ and capacitance $C_L$, said terminal means $Z_T$ being composed of a series resistance $R_T$ and a series capacitance $C_T$, said impedance means forming with said converter means a capacitance $x/R_Tv-xC_L$ and further including across the input of said converter means a resistance $1/G_L$ and a series network having a resistance $R_T^2C_Tv/x$ and a capacitance $x/R_Tv$, wherein $v=R_T/L_L=C_T/R_L$.

12. A transmission system as in claim 6 wherein said conductive means connecting said converter means are separated from each other by a distance $x$ and wherein said impedance $z$ per-unit-length is approximated by a series resistance per-unit-length $R_L$ and a series inductance per-unit-length $L_L$, said admittance per-unit-length $y$ being approximated by per-unit-length conductance $G_L$ and capacitance $C_L$, said terminal means $Z_T$ being composed of a series resistance $R_T$ and a series capacitance $C_T$, said impedance means and said converter means changing the value of the total admittance of said line over the distance $x$ from its capacitance $C_L$ and conductance $G_L$ toward a total value represented by a shunt capacitor having a value $x/R_Tv$ and a shunt circuit composed of a series resistor $-R_T^2C_Tv/x$ and a series capacitor $-x/R_Tv$, wherein $v=R_T/L_L=C_TR_L$.

13. A system as in claim 6 wherein separate lines furnish power to said negative impedance converter means.

References Cited

UNITED STATES PATENTS 2,933,703 4/1960 Kinariwala ---------- 333—80

HERMAN KARL SAALBACH, *Primary Examiner.*

P. L. GENSLER, *Assistant Examiner.*

U.S. Cl. X.R.

333—80; 307—322; 179—170; 330—12